United States Patent
Baldemair et al.

(10) Patent No.: US 10,305,639 B2
(45) Date of Patent: May 28, 2019

(54) HIGH-RELIABILITY TRANSMISSION SCHEME WITH LOW RESOURCE UTILIZATION

(71) Applicant: Telefonaktiebolaget LM Ericsson (publ), Stockholm (SE)

(72) Inventors: Robert Baldemair, Solna (SE); Gabor Fodor, Hässelby (SE); Ather Gattami, Stockholm (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/105,694

(22) PCT Filed: Dec. 20, 2013

(86) PCT No.: PCT/SE2013/051606
§ 371 (c)(1),
(2) Date: Jun. 17, 2016

(87) PCT Pub. No.: WO2015/094069
PCT Pub. Date: Jun. 25, 2015

(65) Prior Publication Data
US 2017/0005758 A1 Jan. 5, 2017

(51) Int. Cl.
*H04L 12/26* (2006.01)
*H04L 1/18* (2006.01)
(Continued)

(52) U.S. Cl.
CPC ............ *H04L 1/1825* (2013.01); *H04L 1/188* (2013.01); *H04L 1/189* (2013.01); *H04L 1/1887* (2013.01); *H04L 5/0055* (2013.01); *H04L 1/1671* (2013.01)

(58) Field of Classification Search
CPC .................................................... H04L 1/1825
(Continued)

(56) References Cited

U.S. PATENT DOCUMENTS 7,145,889 B1    12/2006  Zhang et al.
2007/0266292 A1*  11/2007  Korndewal ............. H04L 1/188
                                                              714/749
(Continued)

FOREIGN PATENT DOCUMENTS

CN    1349694 A    5/2002
CN    102017503 A    4/2011
(Continued)

OTHER PUBLICATIONS

Coverage Improvements for Enhanced Uplink by Liu Jinhua et al.; Vehicular Technology Conference, 2009. VTC Spring 2009. IEEE 69th, Apr. 26-29, 2009.
(Continued)

*Primary Examiner* — Dang T Ton
(74) *Attorney, Agent, or Firm* — Baker Botts, LLP

(57) ABSTRACT

Transmitting node and receiving node and methods therein for a high-reliability transmission scheme with low resource utilization. The transmission scheme comprises two modes, where a first mode comprises regular acknowledged retransmission, and a second mode comprises accelerated, or otherwise ramped-up retransmission, thus improving the probability of conveying a message successfully within an allowed delay budget.

28 Claims, 9 Drawing Sheets

(51) Int. Cl.
*H04L 5/00* (2006.01)
*H04L 1/16* (2006.01)

(58) Field of Classification Search
USPC .......................................................... 370/329
See application file for complete search history.

(56) References Cited

U.S. PATENT DOCUMENTS

| | | | | |
|---|---|---|---|---|
| 2010/0122136 A1* | 5/2010 | Korndewal | ............. | E03C 1/041 714/749 |
| 2011/0041026 A1 | 2/2011 | Fan et al. | | |
| 2011/0051840 A1 | 3/2011 | Hooki et al. | | |
| 2011/0268059 A1* | 11/2011 | Li | ........................ | H04L 1/1812 370/329 |

FOREIGN PATENT DOCUMENTS

| | | |
|---|---|---|
| CN | 103262452 A | 8/2013 |
| EP | 1 833 189 | 9/2007 |
| EP | 2 106 056 A1 | 9/2009 |
| EP | 2106056 | 9/2009 |
| JP | 09-224017 | 8/1997 |
| RU | 2235432 | 9/1998 |
| WO | WO 2005 109729 | 11/2005 |
| WO | WO2005109729 | 11/2005 |
| WO | WO 2009 136829 | 11/2009 |
| WO | WO2009136829 | 11/2009 |
| WO | WO 2013 011545 A1 | 1/2013 |

OTHER PUBLICATIONS

International Search Report for International application No. PCT/SE2013/051606—Sep. 22, 2014.
PCT Written Opinion of the International Searching Authority for International application No. PCT/SE2013/051606—Sep. 22, 2014.
Official Action issued by the Russian Federation for PCT Application No. PCT/SE2013/051606—Dec. 15, 2016.
EPO Communication Pursuant to Article 94(3) EPC for Application No. 13 899 837.2-1851—Dec. 7, 2016.
EPO Supplementary European Search Report for Application No. EP 13 89 9837—Nov. 18, 2016.
A Performance Analysis of Selective-Repeat ARQ With Multicopy Retransmission; Proceedings IEEE International Conference on Universal Personal Communication by Hirokazu Tanaka—1995.
A Study on Type-I Hybrid ARQ Scheme on Fading Channels by Tanaka et al.; Institute of Electronics, Information and Communication Engineers; IEICE Technical Report (Communication Systems)—Jul. 1996.
KIPO's Notice of Preliminary Rejection issued for Korean Patent Application No. 10-2016-7019793 (English translation included)—Oct. 26, 2016.
JP Notification of Reasons for Refusal issued for Japanese Patent Application No. 2016-541501 (English translation included)—Dec. 6, 2016.
Notification of the First Office Action issued by the Patent Office of the People's Republic of China for Application No. 2013800817209—Mar. 3, 2017.
Final Office Action issued by the Japanese Patent Office for JP Application No. 2016-541501—May 16, 2017.
CN Office Action Search Report issued by the Patent Office of the People's Republic of China for Application 2013800817209—Feb. 23, 2017.
Notification of Third Office Action issued by the Patent Office of the People's Republic of China for Application No. 2013800817209—Dec. 25, 2017.

* cited by examiner

HIGH-RELIABILITY TRANSMISSION SCHEME WITH LOW RESOURCE UTILIZATION

PRIORITY

This nonprovisional application is a U.S. National Stage Filing under 35 U.S.C. §371 of International Patent Application Serial No. PCT/SE2013/051606, filed Dec. 20, 2013, and entitled "High-Reliability Transmission Scheme With Low Resource Utilization."

TECHNICAL FIELD

The solution described herein relates generally to high-reliability transmission, and in particular to retransmission schemes.

BACKGROUND

Currently the focus of mobile communication systems is on mobile broadband to provide Internet connectivity. Optimizations in such networks are typically done to improve throughput performance. These networks, and more importantly, the applied transmission schemes, are not optimized for extreme reliability and at the same time extreme latency-critical applications. Reliability in this context refers to the probability that a message, or packet, sent by a transmitter node reaches the receiver within some time interval in such a way that the receiver can decode the message.

Examples of applications requiring high-reliability and low-latency are various machine type communications, MTC, traffic safety related applications, certain smart grid applications such as tele-protection, and process control in industries.

LTE, High Speed Packet Access, HSPA, and other modern wireless communication systems apply re-transmission schemes to improve the reliability of the system.

In a simple Automatic Repeat Request, ARQ, system a transmitter transmits a message and re-transmits the message if no acknowledgement, ACK, is received within a specific time. Classical ARQ schemes do not apply Forward Error Correction, FEC, but only Error Detection to enable the receiver to determine correctness of the message. An illustration of ARQ is shown in FIG. 3, where a first ($1^{st}$ TX) and a second ($2^{nd}$ TX) transmission of a message are not successfully received by a receiver, which sends a negative acknowledgement NACK. The third transmission ($3^{rd}$ TX) is successfully received and acknowledged by the receiver with an ACK.

Hybrid ARQ, HARQ, is a combination of ARQ and FEC. Due to the FEC the receiver has the possibility to recover a message even if it is corrupted as long as the message is not too disturbed. If the receiver fails to recover the message it will send a negative acknowledgement, NACK, to the receiver to request a re-transmission, otherwise an ACK. Depending on the applied HARQ scheme, re-transmissions of the message are either identical copies of the original transmission or different subsets of coded bits of the original transmission. The latter is called Hybrid ARQ with incremental redundancy, and is applied in LTE and HSPA.

Hybrid ARQ can optionally use soft combining, where the receiver combines the previously received data bits and the current ones to decode the message. Soft combining is used in, for example, high speed downlink packet access, HSDPA, networks and LTE.

The minimum time between two transmissions/retransmissions is given by the time needed by the receiver to receive a transmission, decode it, generate and send the acknowledgement, either ACK or NACK; and the time needed by the transmitter to receive and decode the acknowledgement and prepare a re-transmission. This time is referred to as the Re-transmission Round Trip Time, RTT.

In LTE, the Transmission Time Interval, TTI, i.e. the minimal time unit seen by higher layers, is 1 ms. The Hybrid ARQ roundtrip time in LTE UL is fixed to 8 TTI, i.e. 8 ms.

For low-latency applications, there is a limited time within which a packet or message must be delivered, i.e. only a certain delay D is allowed for each package. Therefore, in low-latency applications, a successful reception of a packet or message must take place within this limited time or delay; otherwise the message is outdated and lost. It is a problem to achieve reliable delivery, i.e. reception, of low-latency related messages within the limited time or delay D when using regular re-transmission schemes.

SUMMARY

This herein disclosed solution relates to a transmission scheme to improve resource efficiency for low-latency/high-reliability transmissions. It proposes to start a message transmission with a regular re-transmission scheme. After e.g. a configurable time—which is lower than the latency budget—and without having received an ACK from the receiver the transmitter starts to use a more "aggressive" transmission mode. This transmission mode could be continuous transmission, transmissions with higher power, more frequent transmissions, transmissions with more redundancy, etc. Metaphorically, it could be described as that the transmitter starts to "panic" after the e.g. configurable time and starts to "shout".

According to the disclosed solution, most of the messages will be conveyed successfully from transmitter to receiver using a regular retransmission scheme in the first transmission mode, well within the latency budget. For those messages, no unnecessary retransmissions are performed. Only for those few messages that are not successfully received with regular re-transmissions in the first transmission mode, a second transmission mode is used. In the second transmission mode, resource efficiency is traded for reliability, e.g. data is continued to be transmitted even after successful reception, until the transmitting node has received an ACK.

However, since only few messages are handled in this way the "resource waste" on system level is small. The disclosed solution increases reliable reception of messages within a given latency budget without performing high overprovision of resources.

A particular advantage of the disclosed solution is the ability to dynamically adjust the communication mode to varying channel states in high mobility or high channel quality variation situations. For example, if the transmitter and receiver moves within an area with variable shadow conditions, the disclosed solution helps to use the best transmission mode adaptively.

According to a first aspect, a method is provided, which is to be performed by a transmitting node, which is operable to apply an ARQ scheme. The method comprises transmitting a message to a receiving node in an acknowledged first transmission mode. The method further comprises detecting an indication of unsuccessful reception of the message, or of a re-transmission related to the message. The method further comprises switching to a second transmission mode based on the detected indication; and, in the second transmission mode: re-transmitting said message, or part thereof, a plurality of times, without waiting for acknowledgement of message reception before transmitting the next re-transmission.

According to a second aspect, a method is provided, which is to be performed by a receiving node, which is operable to apply an ARQ scheme. The method comprises, in a first reception mode: detecting unsuccessful reception of a transmission from a transmitting node, said transmission being a message or a re-transmission related to the message. The method further comprises indicating the unsuccessful reception to the transmitting node; and switching 203 to a second reception mode, at least partly based on said detected unsuccessful reception. The method further comprises, in the second reception mode: receiving at least one re-transmission related to the message. The first reception mode corresponds to an acknowledged first transmission mode comprising re-transmitting upon an indication of unsuccessful reception, and the second reception mode corresponds to a second transmission mode comprising re-transmitting without waiting for acknowledgement of message reception before transmitting the next re-transmission.

According to a third aspect, a transmitting node is provided, which is operable to apply an ARQ scheme. The transmitting node is operative to, in an acknowledged first transmission mode, transmit a message to a receiving node. The transmitting node is further operative to detect an indication of unsuccessful reception, at the receiving node, of the message or of a re-transmission related to the message; and to switch to a second transmission mode based on the detected indication. The transmitting node is further operative to, in the second transmission mode, re-transmit said message, or part thereof, a plurality of times, without waiting for acknowledgement of message reception before transmitting the next re-transmission.

According to a fourth aspect, a receiving node is provided, which is operable to apply an ARQ scheme. The receiving node is operative to, in a first reception mode, detect unsuccessful reception of a transmission from a transmitting node, said transmission being a message or a re-transmission related to the message. The receiving node is further operative to indicate the unsuccessful reception to the transmitting node; and to switch to a second reception mode, at least partly based on said detected unsuccessful reception. The receiving node is further operative to, in the second reception mode, receive at least one re-transmission related to the message. The first reception mode corresponds to an acknowledged first transmission mode comprising re-transmitting upon an indication of unsuccessful reception, and the second reception mode corresponds to a second transmission mode comprising re-transmitting without waiting for acknowledgement of message reception before transmitting the next re-transmission.

According to a fifth aspect, a computer program is provided, which when run in a transmitting node causes the transmitting node to perform the method according to the first aspect above.

According to a sixth aspect, a computer program is provided, which when run in a receiving node causes the receiving node to perform the method according to the second aspect above.

According to further aspects, computer program products are provided comprising respective computer programs according to the fifth and sixth aspects above.

BRIEF DESCRIPTION OF DRAWINGS

The foregoing and other objects, features, and advantages of the solution disclosed herein will be apparent from the following more particular description of embodiments as illustrated in the accompanying drawings. The drawings are not necessarily to scale, emphasis instead being placed upon illustrating the principles of the solution disclosed herein.

DETAILED DESCRIPTION

Application of regular re-transmission schemes, typically used in cellular communications, to low-latency/high-reliability communications implies the following: The transmission medium is not used continuously but for example only every N-th possible slot if the Re-transmission Round Trip Time, RTT, is N Transmission Time Intervals, TTIs. The minimum number N depends on the time it takes to provide feedback from receiver to transmitter and the time it takes the transmitter to decode the feedback. The consequence is that the medium is only used an N-th part during a given latency budget. If, at the end of this time budget, the message has not been successfully decoded, this may be a consequence of that the medium has only been utilized 1/N-th of the available time, i.e. only 1/N-th of the possible energy has been conveyed.

To overcome this drawback, the transmitter can send continuously to the receiver during the complete latency budget. This ensures that maximum amount of energy is conveyed from the transmitter to the receiver and thus link reliability is maximized. The drawback of continuous transmission is that often too many resources are used; there is no need to continue transmission after the receiver has been able to decode the message.

Figure 4:
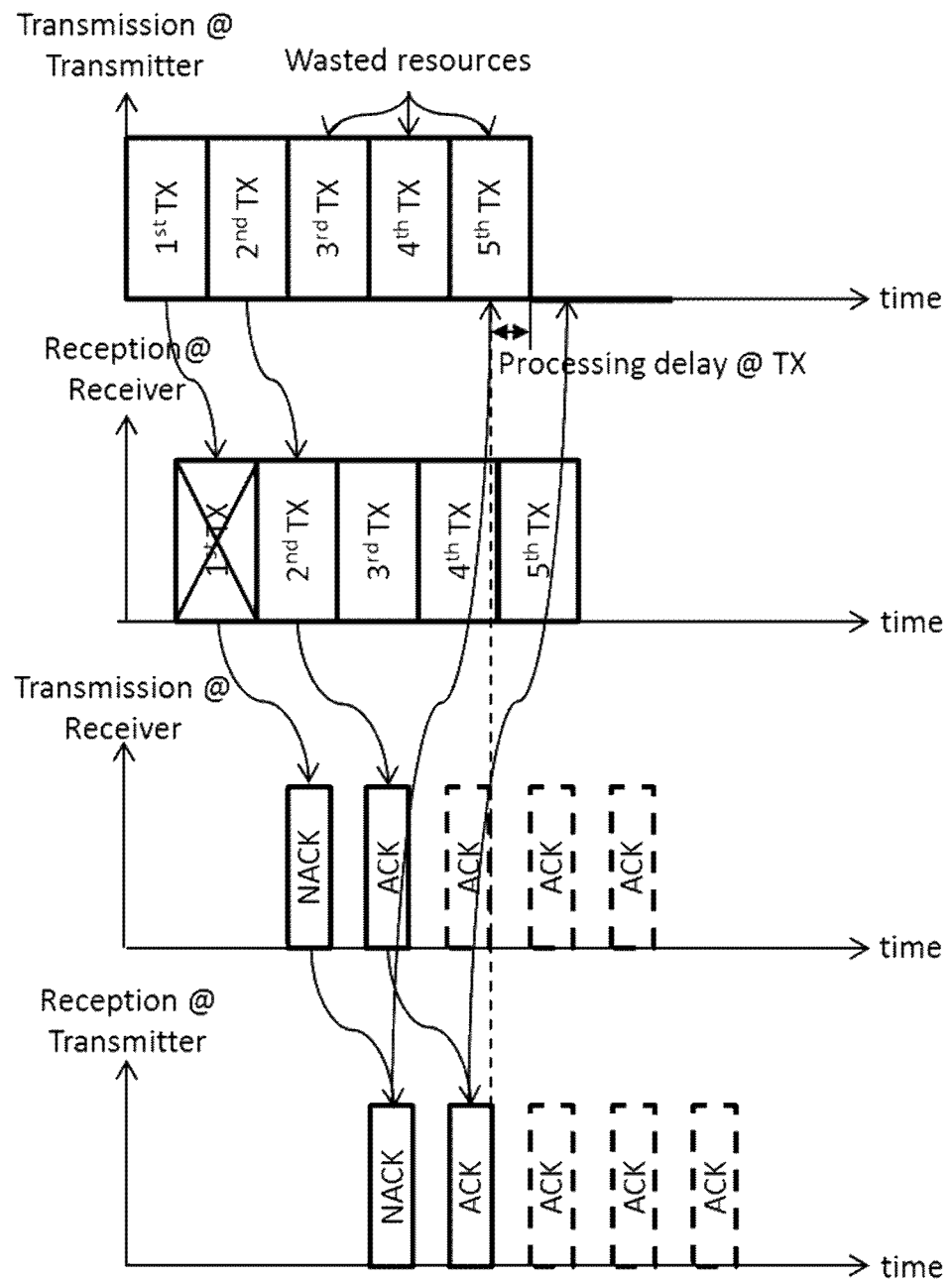
FIG. 4 illustrates a continuous re-transmission scheme, which may be used in a second transmission mode according to an exemplifying embodiment.

A compromise would be to perform continues transmission until an acknowledgement, ACK, is received and then stop transmitting. But even here transmission resources are wasted between the time the receiver has successfully decoded a message until the transmitter has been able to decode the ACK sent by the receiver, which is illustrated in FIG. 4.

Herein, a transmission system for high-reliability and low-latency messages is disclosed, which uses at least two modes or phases where different transmission strategies are applied:

1) In the first phase or mode, a state-of-the-art re-transmission system is applied. A message is transmitted and before re-transmission takes place the transmitter must have received feedback. If the feedback is disturbed and not received by the transmitter this can be considered as NACK.

2) The second phase or mode starts when receiving an indication of that a message has not been successfully received by a receiving node e.g. after a configurable time that is shorter than the latency budget of the message. In the second phase, a transmission mode is used that is more likely to be successfully received by the receiver but at the cost of increased utilization of resources. Resources in this context can be more time/frequency/code/power resources, computational resources or consumed energy in transmitter and/or receiver if a more powerful but complex transmission mode is used.

According to different embodiments of the disclosed solution, mode switching from state of the art transmission mode to a second transmission mode e.g. continuous transmission, can be triggered by different conditions such as:

- A configurable number of consecutive NACKS at the transmitter
- Expiry of a predefined time out for successfully transmitting a packet, that is time out for receiving an ACK
- Explicitly triggered by a message received from the receiver node, based on e.g. channel state information at the receiver, CSIR.

Figure 5:
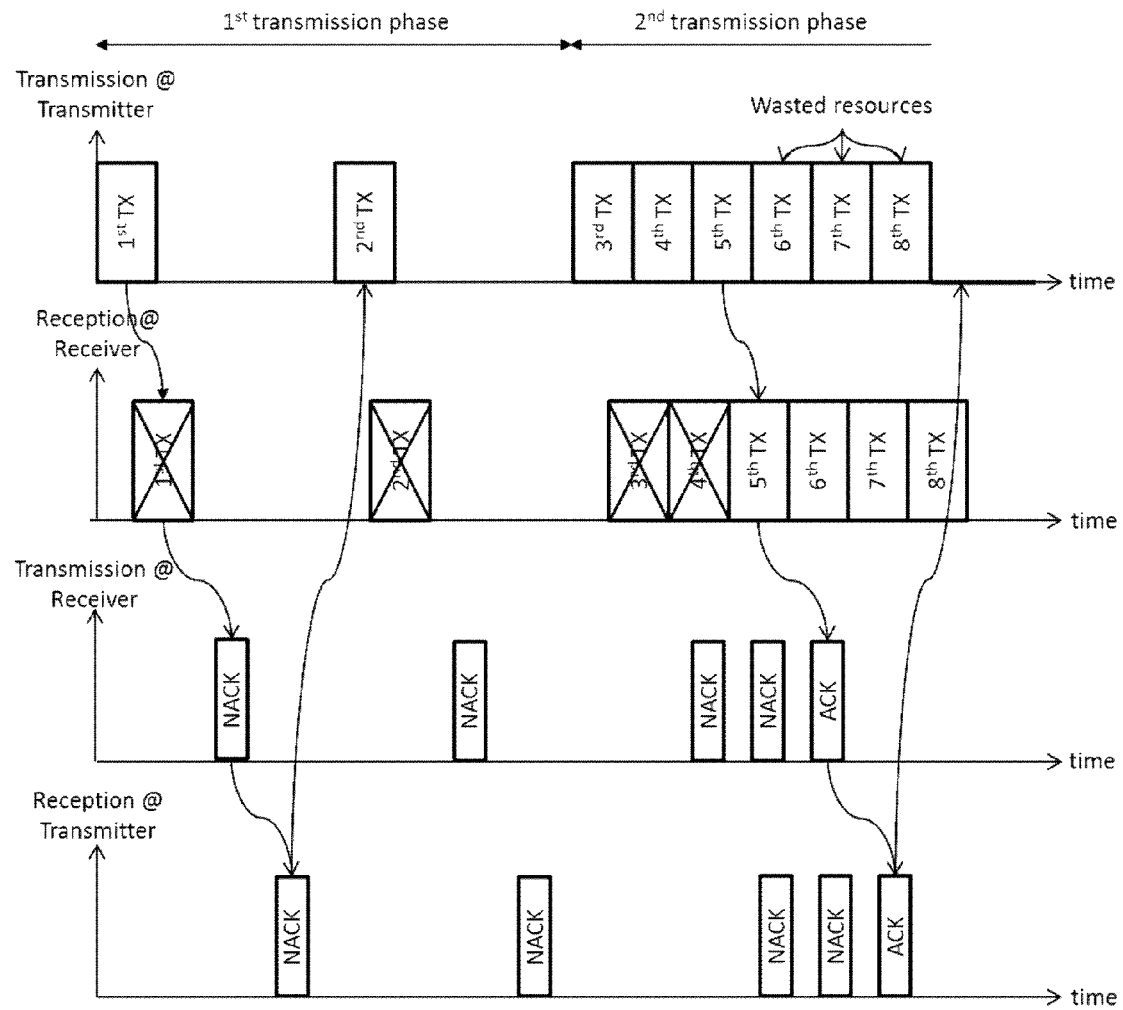
FIG. 5 illustrates re-transmission in a first and a second transmission mode, according to an exemplifying embodiment.

The transmitter has different possibilities to discontinue, or end, the second transmission mode, e.g. continuous transmission. Examples are:

- Transmitter switches back to normal, state of the art, method after detecting N successful consecutive ACKs;
- Transmitter switches back to normal transmission method after a time T, unless NACK messages has been received FIG. 5 outlines a simple example comprising two transmission phases or modes. In the first phase the message ($1^{st}$ TX) is transmitted and re-transmitted ($2^{nd}$ TX) since no ACK is received. After a configurable time the transmitter switches to the second phase. In this example, instead of waiting for feedback from the receiver, the transmitter starts to transmit continuously. Since now the medium is continuously used, the conveyed energy is maximized within the second phase which also maximizes the reception likelihood from link perspective.

Further, in FIG. 5, after some time within the second phase, the receiver successfully receives the message and sends an ACK. Since the feedback needs time to propagate to and be decoded by the transmitter, unnecessary re-transmissions may inevitably occur from the time of successful message reception at receiver and feedback reception at transmitter. This waste of resources is the paid price of increased reception probability, i.e. reliability.

Another variant would be that the receiver does not transmit any ACK in the second phase and the transmitter transmits until the message validity has expired, i.e. the allowed latency budget has been exceeded. This wastes even more resources, but simplifies the transmission protocol.

Switching to a continuous transmission mode in the second phase or mode is only one out of many possible examples. Another example is to assign for each transmission more resources and decrease the coding rate. More resources could be e.g. in time, frequency, code or power. For example, one possibility is to transmit with an increased power, without changing code rate.

Another possibility is to reduce the time interval between re-transmissions. In the extreme case this leads to continuous transmissions. Further, the assigned bandwidth could be increased in the second transmission mode, and/or the assigned resources could be distributed in the frequency domain to increase frequency diversity.

Another possibility is to use a changed transmission format. For example, within a transmission, the amount and/or energy of reference signals can be increased to improve channel estimation.

Another possibility is to use more transmit and/or receive antennas and change the multiple-antenna transmission scheme accordingly in the second transmission mode. For example, a single transmit antenna may be used in the first transmission mode, and multiple transmit antennas with antenna diversity may be used in the second transmission mode.

Another possibility is to use a more complex but also more processing intensive transmission strategy. For example, transmissions in the first transmission mode, or first phase, could be based on simple codes, e.g. convolutional codes, whereas transmissions in the second transmission mode, or second phase, are based on advanced codes, e.g. low-density parity-check codes, LDPC, or Turbo codes. In both phases the same amount of resources e.g. power, time, frequency, codes, and antennas, could be used. The difference is that, given the same code rate, advanced codes achieve better performance than simple codes. Even though the spent transmission resources are the same, the energy consumption/computational resources in transmitter and/or receiver are less in the first phase than in subsequent phases. This aspect of the invention is especially interesting for energy/processing limited communication devices, e.g. battery operates sensors. Such a device could start with a less complex transmission mode and only if the message is not received after a certain time a more complex transmission mode is used.

Another possibility is to enable multi-path diversity in the second phase or transmission mode, i.e. the number of transmission and/or reception points is higher in the second phase than in the first phase or transmission mode.

A feedback scheme can be used in the second transmission phase but it is also possible not to use feedback in the second transmission phase, i.e. the second transmission phase extends until the end of the allowed latency budget.

All of above schemes can also be combined, for example re-transmissions in the second phase can be more frequent and each re-transmission itself contains more resources than in the first phase.

In addition the system can be generalized to multiple transmission phases or modes. For example, one could envision three or more phases where the duration between re-transmissions decreases from one phase to the next. See FIG. 6 for a graphical illustration.

In a system with multiple users deploying the herein disclosed transmission system, the parameters, such as start of second and potentially other later phases, parameters of phases, e.g. amount of resources, re-transmission interval, etc, can be set individually for each user or group of users. For example, in a communication system where users can be grouped and users within the same group need to transmit messages with similar/equal characteristics e.g. latency and reliability, users within the same group may be configured with similar parameters. Users in groups with more stringent message requirements may be configured with "better" parameters.

Instead of linking the configuration of transmission phases to users it can also be linked to message characteristics. This is useful if one user can transmit messages with different characteristics. In this case message types could be grouped and the configuration could be done per message type group instead of per message type.

The methods disclosed herein can also be combined with rich feedback. Often the ACK or NACK is just a single bit indicating correctness of the message. With rich feedback a more detailed status of the current reception status can be conveyed, e.g. if the receiver is "close" to decode the message or not. The determination of "close" could for example be based on soft values or log-likelihood ratios of the message bits. If the received feedback indicates the receiver already has almost enough information to decode the message transition into the next phase can happen later or the transmission mode in the second phase uses less resources than it would otherwise.

In the following paragraphs, different aspects of the solution disclosed herein will be described in more detail with references to certain embodiments and to accompanying drawings. For purposes of explanation and not limitation, specific details are set forth, such as particular scenarios and techniques, in order to provide a thorough understanding of the different embodiments. However, other embodiments may depart from these specific details.

Figure 1:
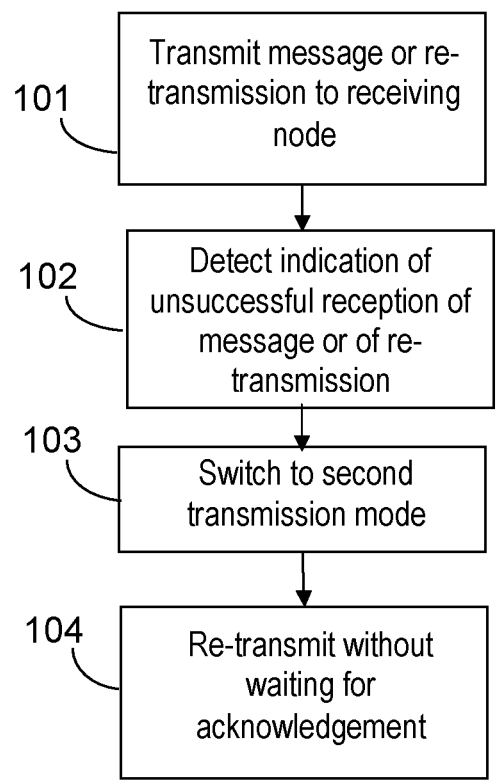
FIG. 1 is a flow chart of a method performed by a transmitting node, according to an exemplifying embodiment.

Exemplifying Method Performed by a Transmitting Node, FIG. 1

An exemplifying method performed by a transmitting node will be described below with reference to FIG. 1. The transmitting node is operable to apply an automatic repeat request, ARQ, scheme, i.e. a scheme for re-transmission, e.g. HARQ. The transmitting node may be e.g. a radio base station, RBS, such as an LTE eNB, an access node, a relay or a user equipment, UE, such as an LTE UE, a sensor, an actuator, a communication device, a tablet, a computer or any other device capable of wireless communication. A radio base station could alternatively be denoted eNodeB, NodeB or simply base station.

FIG. 1 illustrates the method comprising, in an acknowledged first transmission mode: transmitting 101 a message to a receiving node. The method further comprises detecting 102 an indication of unsuccessful reception, at the receiving node, of the message or of a re-transmission related to the message. The method further comprises switching 103 to a second transmission mode based on the detected indication; and, in the second transmission mode: re-transmitting 104 said message, or part thereof, a plurality of times, without waiting for acknowledgement of message reception before transmitting the next re-transmission.

The first transmission mode is characterized by a regular acknowledged retransmission procedure, such as an ARQ or HARQ scheme. After transmission of a message, the transmitter awaits an acknowledgement before any re-transmission related to the message. The acknowledgement may be negative or positive, explicit or implicit. An example of a negative implicit acknowledgement is e.g. the absence of an ACK in a certain time window after the transmission of the message, related to the RTT. That is, the expression "receiving an indication of unsuccessful reception" is considered to cover also the interpreting of the absence of an ACK as a NACK.

The indication of unsuccessful reception could be or comprise different things, which will be described in more detail below. The indication relates to a reception at a receiving node, which is an intended receiver of the message. That is, the indication indicates that the message is unsuccessfully received at a receiving node.

The switching to the second transmission mode is performed based on the detected indication of unsuccessful reception. The second transmission mode is characterized by that the transmission scheme is altered in order to increase the probability of successful reception within the latency budget, as compared to the first transmission mode. This could be implemented in a number of ways, which will be further described below. In the second transmission mode, a re-transmission of a message is performed without or before receiving an acknowledgement, positive or negative, of message reception. This may be referred to as an unacknowledged mode, however, the transmitted message may be acknowledged by a receiving node, even though the transmitting node does not await or receive the acknowledgement before re-transmitting the message or part thereof.

This method increases the probability of successful reception within the latency budget for high-reliability and latency-critical applications.

For example, a time interval between subsequent transmissions related to the message may be shorter in the second transmission mode than in the first transmission mode. This is illustrated e.g. in FIGS. 5 and 6. The time interval between re-transmissions in the second transmission mode may also decrease over time, which is illustrated in FIG. 6, when defining the $2^{nd}$ and $3^{rd}$ transmission phase as the second transmission mode.

Figure 6:
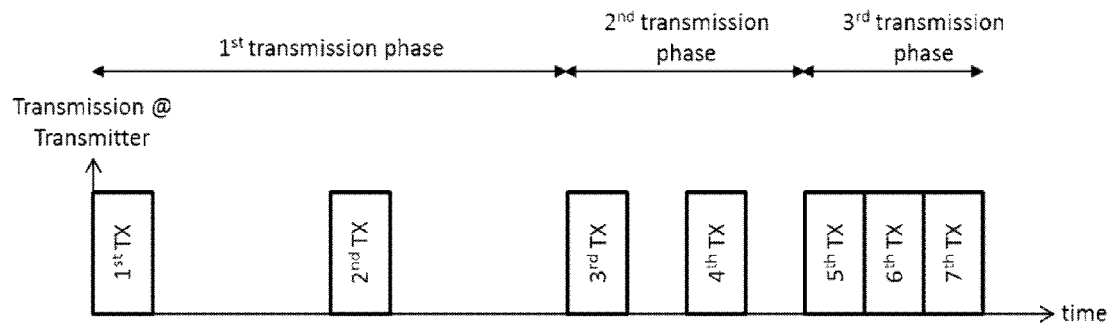
FIG. 6 illustrates re-transmission in a first and a second mode, according to an exemplifying embodiment.

An extreme case of shorter time interval in the second transmission mode is continuous transmission, which is illustrated in FIGS. 4 and 5, and also in a $3^{rd}$ transmission phase in FIG. 6.

The second transmission mode may be ended based on different events, such as at the reception, from a receiving node, of at least one indication of successful reception related to the message. Alternatively or in addition it may be ended at the elapse of a time T from the switching to the second transmission mode; at the elapse of a time T' from the transmitting of the message, e.g. the start of the first transmission of the message, or after the reception of a predefined number of NACKs.

Further, the indication of unsuccessful reception may comprise e.g. a predefined number, one or more, of negative acknowledgements, NACKs, related to the message, where the NACKs could be explicit or implicit. Alternatively or in addition, the indication of unsuccessful reception may comprise rich feedback, including e.g. information about the receiver decoding status and/or it may comprise an indication of conditions at the receiving node preventing successful reception in the first transmission mode.

That is, the transmitting node may switch to the second transmitting mode when having received a predefined number of NACKs, explicit or implicit, related to a message, from a receiving node. In an extreme case, it may change to the second transmission mode already after receiving one NACK related to the message. However, the number of NACKs may be determined or set based e.g. on the RTT, the delay sensitivity of the transmission and/or the latency budget.

When the indication of unsuccessful reception comprises rich feedback, the second transmission mode could be adapted or selected based on the information given by the rich feedback. For example, the time between re-transmissions may depend on the extent to which the receiving node has succeeded in decoding the received message. Often, an ACK or NACK is just a single bit indicating correctness of the message. However, with rich feedback a more detailed status of the current reception status can be conveyed, e.g. if the receiver is "close" to decode the message or not. The determination of "close" could for example be based on soft values or log-likelihood ratios of the message bits. If the received feedback indicates the receiver already has almost enough information to decode the message, transition into the next phase/second transmission mode can happen later or the second transmission mode may use less resources than it would otherwise.

An indication of conditions at the receiving node preventing successful reception in the first transmission mode could be e.g. a message comprising channel state information, CSI, or a parameter or information derived from CSI. That is, it may be an indication of that the receiving node is subjected to substantial interference and thus has a hard time receiving messages from the transmitting node.

For example, more resources, in terms of time, frequency, code, power, transmission points and/or computational resources could be used for re-transmission in the second transmission mode than in the first transmission mode. That is, increased resources usage, such as shorter time between re-transmissions; more complex codes, transmission from multiple antennas and/or other diversity could be applied in order to get the message through to the receiving node, i.e. to be successfully received.

The resources used for re-transmissions in the second transmission mode may depend on information related to unsuccessful reception received from the receiving node. That is, as described above, rich feedback information may be indicative of that more or less resources are needed in order to achieve successful reception.

Even though not explicitly mentioned when describing the first transmission mode above, it is considered implicitly disclosed that resources are used for transmission and retransmission of the message in the first transmission mode.

Figure 2:
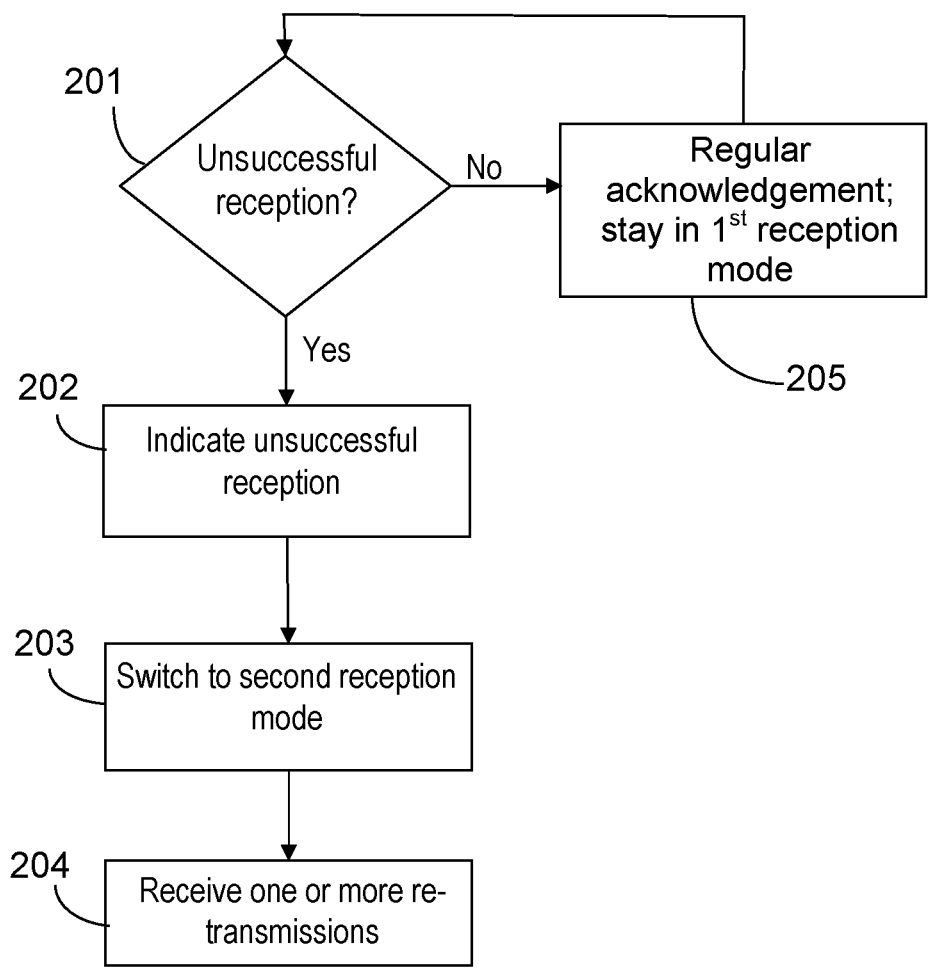
FIG. 2 is a flow chart of a method performed by a receiving node, according to an exemplifying embodiment.
Figure 3:
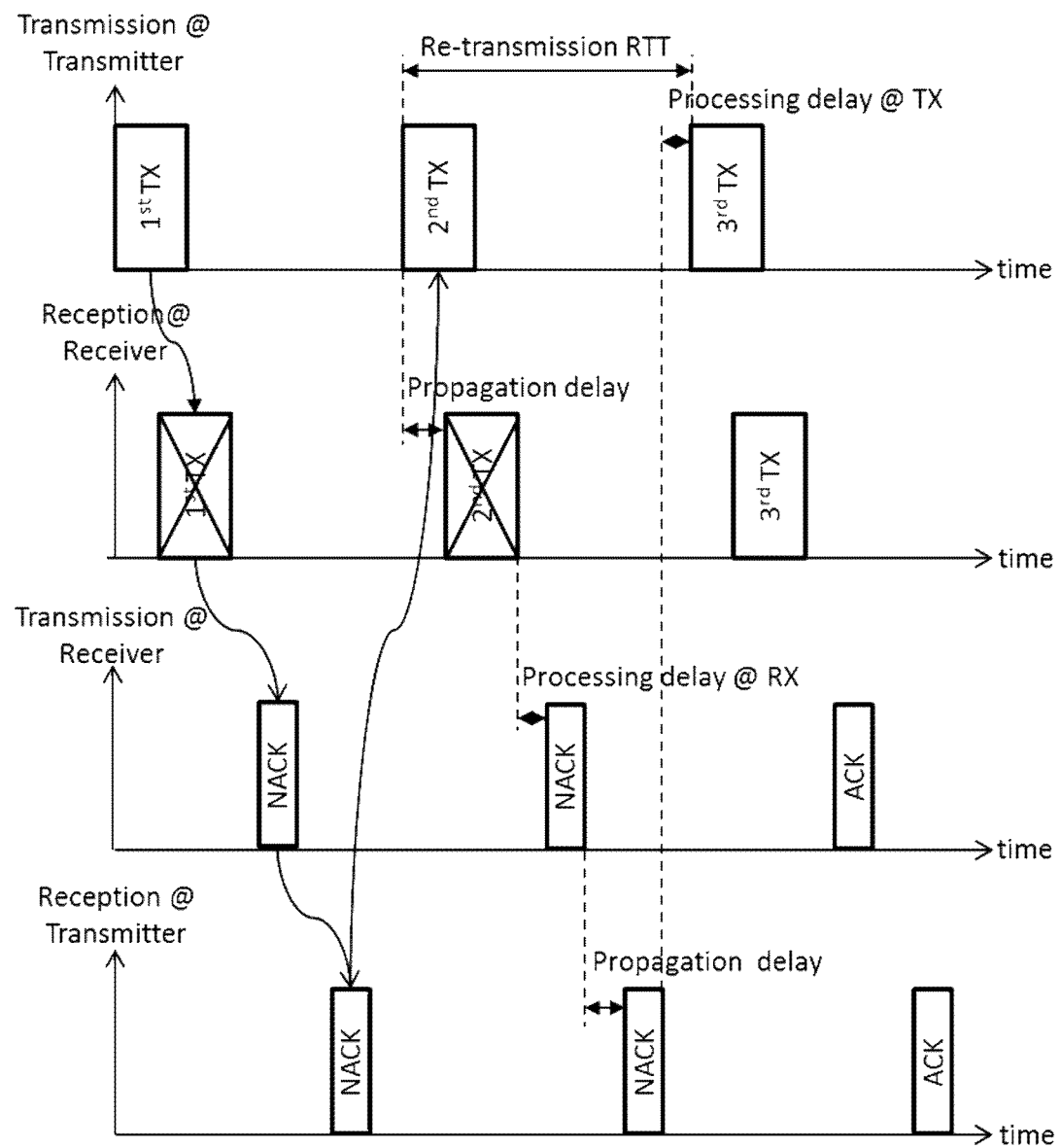
FIG. 3 illustrates an acknowledged re-transmission scheme, according to the prior art.

Exemplifying Method Performed by an Receiving Node, FIG. 2

An exemplifying method performed by a receiving node will be described below with reference to FIG. 2. The method performed by the receiving node corresponds to the method performed by a transmitting node described above. The receiving node is operable to apply an automatic repeat request, ARQ scheme, i.e. a scheme for re-transmission, e.g. HARQ. The receiving node may be e.g. a user equipment UE, such as an LTE UE, a sensor, an actuator, a communication device, a tablet, a computer or any other device capable of wireless communication, or a radio base station, RBS, such as an LTE eNB, an access node or a relay.

FIG. 2 illustrates the method comprising, in a first reception mode: detecting 201 unsuccessful reception of a transmission from a transmitting node, said transmission being a message or a re-transmission related to the message. The method further comprises indicating 202 the unsuccessful reception to the transmitting node; and switching 203 to a second reception mode, at least partly based on said detected unsuccessful reception. The method further comprises, in the second reception mode: receiving 204 at least one re-transmission related to the message. The first reception mode corresponds to an acknowledged first transmission mode comprising re-transmitting upon an indication of unsuccessful reception, and the second reception mode corresponds to a second transmission mode comprising re-transmitting without waiting for acknowledgement of message reception before transmitting the next re-transmission. FIG. 2 also illustrates the case when a successful detection is detected in action 201. When a message is received successfully, the receiving node should not switch to a second reception mode, but stay in a regular reception mode, e.g. denoted first reception mode for the reception of a next message, which is illustrated as action 205 in FIG. 2.

The action of detecting unsuccessful reception may be related to or comprise e.g. a number, one or more, of unsuccessful reception attempts, an elapse of a certain time since an event, such as a first unsuccessful reception attempt, or conditions at the receiving node preventing successful reception in the first transmission/reception mode.

The expression "indicating the unsuccessful reception to the transmitting node" is considered to cover also the refraining from sending an ACK to the transmitting node, which will be interpreted as a NACK by the transmitting node.

As described above in association with the transmitting node, the second transmitting mode may comprise more frequent re-transmissions than the first transmission mode. This could also be expressed as that a time interval between reception of subsequent transmissions related to the message is shorter in the second reception/transmission mode than the first reception/transmission mode. The time duration between re-transmissions in the second transmission mode may decrease over time, as previously described. Further, the second transmission mode may comprise continuous transmission, and thus the second reception mode may comprise continuous reception.

The indicating of unsuccessful reception to the transmitting node may comprise indicating of conditions preventing successful reception in the first transmission mode/reception mode, such as e.g. CSI comprising CQI.

The second reception mode may be ended e.g. at a successful reception related to the message, or, at the elapse of a time T from the switching to the second reception mode, or, at the elapse of a time T' from the detecting of an unsuccessful reception of a transmission e.g. from the start of the first reception related to the message, after the transmission of a predefined number of NACKs, or, after the unsuccessful reception of a predefined number of transmissions related to the message.

The indication of unsuccessful reception may be one of: a predefined number of negative acknowledgements, NACKs related to the message; rich feedback including information about the decoding status, and an indication of conditions at the receiving node preventing successful reception in the first transmission mode.

Figure 7:
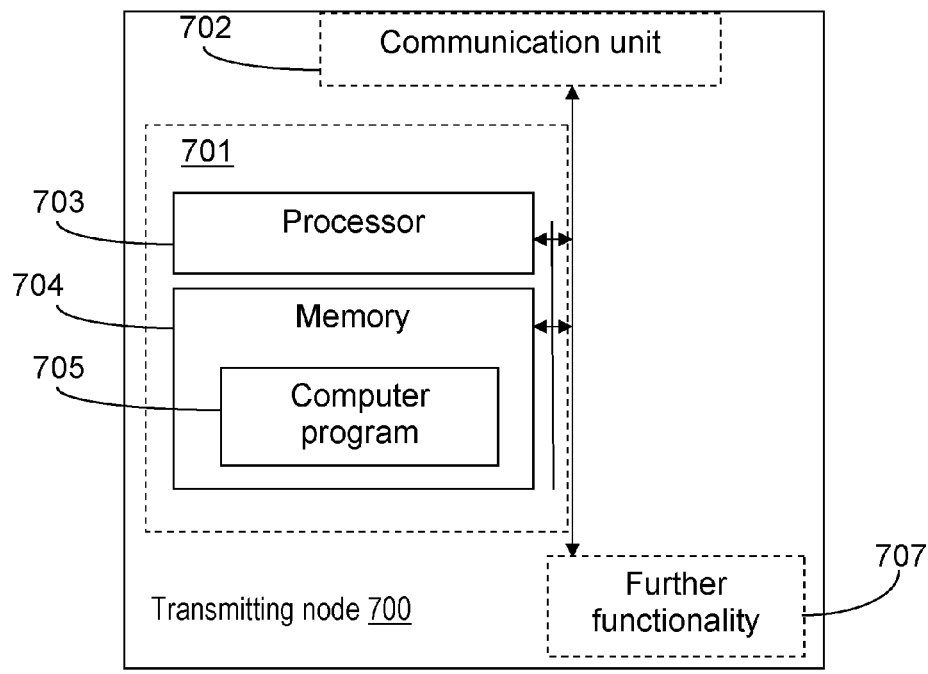
FIGS. 7 and 8 show transmitting nodes according to exemplifying embodiments.

Exemplifying Transmitting Node, FIG. 7

Embodiments described herein also relate to a transmitting node 700. The transmitting node is associated with the same technical features, objects and advantages as the method described above and illustrated e.g. in FIG. 1. The transmitting node will be described in brief in order to avoid unnecessary repetition. The transmitting node 700 could be e.g. a radio base station, RBS, such as an LTE eNB, an access node, a relay or a user equipment UE, such as an LTE UE, a sensor, an actuator, a communication device, a tablet, a computer or any other device capable of wireless communication. The transmitting node may be operable to communicate in one or more wireless communication systems, such as UMTS, E-UTRAN or CDMA 2000.

Below, an exemplifying transmitting node 700, adapted to enable the performance of an above described method adapted to perform at least one embodiment of the method in a transmitting node described above, will be described with reference to FIG. 7.

The transmitting node is operable to apply an ARQ scheme such as HARQ, and is operable to communicate with other nodes or entities in a communication network.

The part of the transmitting node which is mostly related to the herein suggested solution is illustrated as an arrangement 701 surrounded by a broken/dashed line. The arrangement and possibly other parts of the transmitting node are adapted to enable the performance of one or more of the methods or procedures described above and illustrated e.g.

in FIG. 1. The transmitting node may comprise a communication unit 702 for communicating with other entities, and may comprise further functionality 707, which is illustrated with a dashed line.

The transmitting node illustrated in FIG. 7 comprises processing means, in this example in form of a processor 703 and a memory 704, wherein said memory is containing instructions 705 executable by said processor, whereby the transmitting node is operable to perform the method described above. That is, the transmitting node is operative to, in an acknowledged first transmission mode, transmit a message to a receiving node. The transmitting node is further operative to detect an indication of unsuccessful reception, at the receiving node, of the message or of a re-transmission related to the message; and to switch to a second transmission mode based on the detected indication. The transmitting node is further operative to, in the second transmission mode, re-transmit said message, or part thereof, a plurality of times, without waiting for acknowledgement of message reception before transmitting the next re-transmission.

As previously described, the time interval between subsequent transmissions related to the message may be shorter in the second transmission mode than in the first transmission mode. The time interval between re-transmissions in the second transmission mode may decrease over time. The second transmission mode may comprise continuous transmission.

By executing the instructions, the transmitting node may further be operative to end the second transmission mode at the reception of at least one indication of successful reception related to the message, or, at the elapse of a time T from the switching to the second transmission mode, or, at the elapse of a time T' from the transmitting of the message, e.g. the start of the first transmission of the message, or, after the reception of a predefined number of NACKs, implicit or explicit.

Further, the indication of unsuccessful reception may comprise one or more of a predefined number of NACKs related to the message, explicit or implicit; rich feedback including information about the receiver decoding status; and an indication of conditions at the receiving node preventing successful reception in the first transmission mode.

More resources, in terms of time, frequency, code, power, transmission points and/or computational resources may be used for re-transmission in the second transmission mode than in the first transmission mode. The resources used for re-transmissions in the second transmission mode may depend on information related to unsuccessful reception received from the receiving node, as previously described. Even though not explicitly mentioned when describing the first transmission mode above, it is considered implicitly disclosed that resources are used for transmission and retransmission of the message in the first transmission mode.

Figure 8:
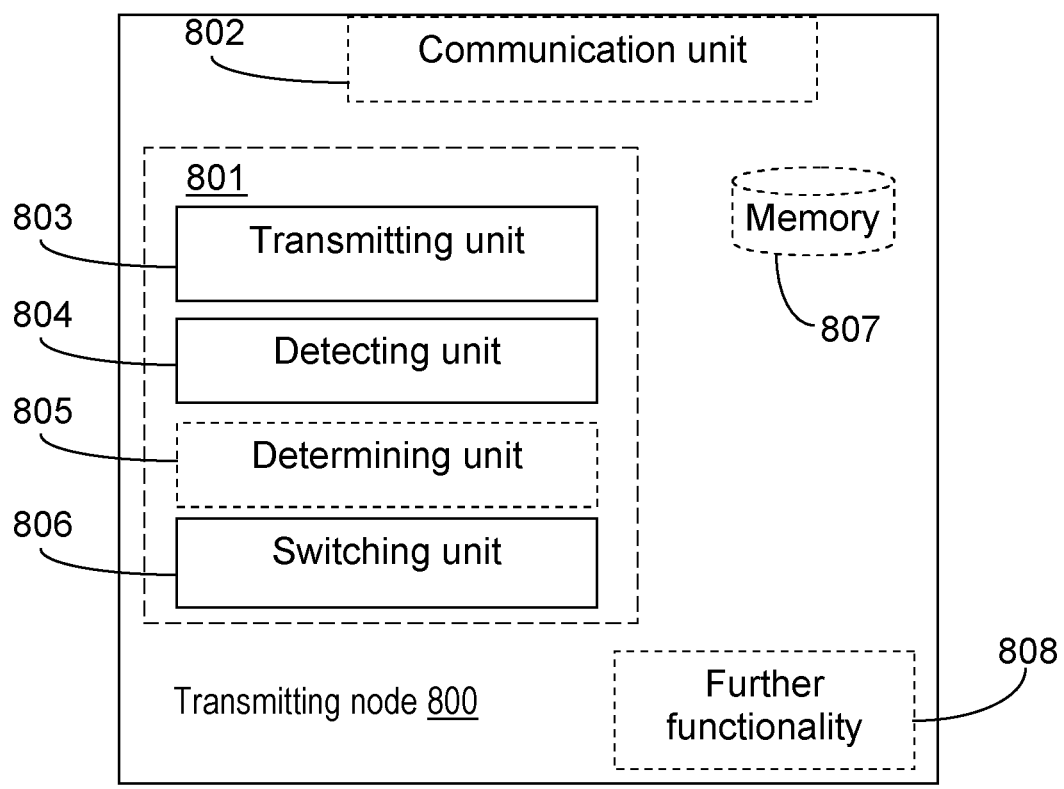

The arrangement 701 may alternatively be implemented and/or schematically described as illustrated in FIG. 8. The arrangement 801 comprises a transmitting unit 803, for, in an acknowledged first transmission mode, transmitting a message to a receiving node. The arrangement further comprises a detecting unit 804, for detecting an indication of unsuccessful reception, at the receiving node, of the message or of a re-transmission related to the message. The arrangement further comprises a switching unit 806, for switching to a second transmission mode based on the detected indication.

The arrangement 801 may comprise an optional determining unit 805, for determining when to switch to a second transmission mode. Alternatively, such a determining function or unit may be part e.g. of the switching unit 806. In the second transmission mode, the message or part thereof is re-transmitted a plurality of times without waiting for acknowledgement of message reception before transmitting the next re-transmission. This could alternatively be expressed as that the transmitting unit 803 is further configured for, in the second transmission mode, re-transmitting the message or part thereof a plurality of times without waiting for acknowledgement of message reception before transmitting the next re-transmission.

The transmitting node 800 could be e.g. a radio base station, RBS, such as an LTE eNB, an access node, a relay or a user equipment UE, such as an LTE UE, a sensor, an actuator, a communication device, a tablet, a computer or any other device capable of wireless communication. The transmitting node may be operable to communicate in one or more wireless communication systems, such as UMTS, E-UTRAN or CDMA 2000.

As for the transmitting node 700, the transmitting node 800, e.g. the arrangement 801 may be adapted such that the time interval between subsequent transmissions related to the message may be shorter in the second transmission mode than the first transmission mode. The time interval between re-transmissions in the second transmission mode may decrease over time. The second transmission mode may comprise continuous transmission.

Further, the second transmission mode may be ended e.g. at the reception of at least one indication of successful reception related to the message, or, at the elapse of a time T from the switching to the second transmission mode, or, at the elapse of a time T' from the transmitting of the message, or after the reception of a predefined number of NACKs, explicit or implicit, from a receiving node.

The indication of unsuccessful reception may comprise one or more of a predefined number of NACKs related to the message; rich feedback including information about the receiver decoding status; and an indication of conditions at the receiving node preventing successful reception in the first transmission mode.

More resources, in terms of time, frequency, code, power, transmission points and/or computational resources may be used for re-transmission in the second transmission mode than in the first transmission mode.

The resources used for re-transmissions in the second transmission mode may depend on information related to unsuccessful reception received from the receiving node.

The arrangement 801, and other parts of the transmitting node could be implemented e.g. by one or more of: a processor or a micro processor and adequate software and storage therefore, a Programmable Logic Device, PLD, or other electronic component(s)/processing circuit(s) configured to perform the actions mentioned above.

The transmitting node 800, illustrated in FIG. 8, may further comprise a communication unit 802 for communicating with other entities, one or more memories 807 e.g. for storing of information and further functionality 808, such as signal processing and/or scheduling.

Figure 9:
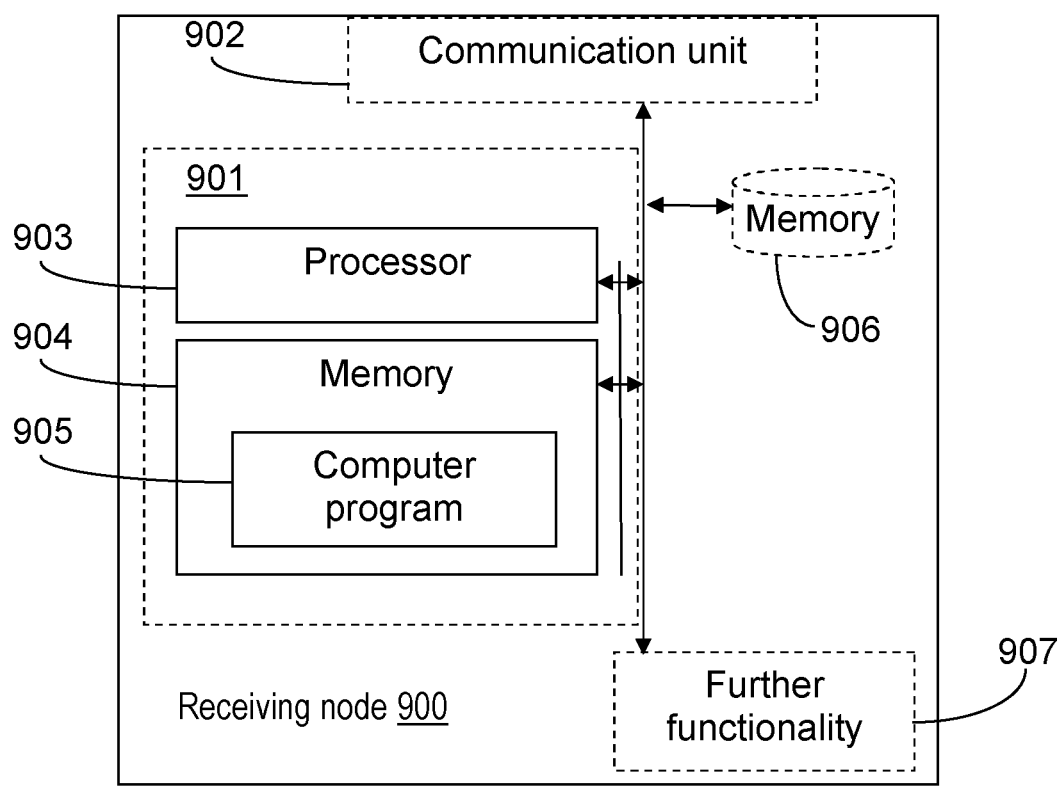
FIGS. 9 and 10 illustrate receiving nodes according to exemplifying embodiments.

Exemplifying Receiving Node, FIG. 9

Embodiments described herein also relate to a receiving node 900. The receiving node is associated with the same technical features, objects and advantages as the method described above and illustrated e.g. in FIG. 2. The receiving node is operable to apply an automatic repeat request, ARQ scheme, i.e. a scheme for re-transmission, e.g. HARQ. The receiving node will be described in brief in order to avoid unnecessary repetition. The receiving node 900 may be e.g.

a user equipment, UE, such as an LTE UE, a sensor, an actuator, a communication device, a tablet, a computer or any other device capable of wireless communication, or a radio base station, RBS, such as an LTE eNB, an access node or a relay. The receiving node may be operable to communicate in one or more wireless communication systems, such as UMTS, E-UTRAN or CDMA 2000.

Below, an exemplifying receiving node 900, adapted to enable the performance of an above described method adapted to perform at least one embodiment of the method in a receiving node described above, will be described with reference to FIG. 9.

The part of the receiving node which is mostly related to the herein suggested solution is illustrated as an arrangement 901 surrounded by a broken/dashed line. The arrangement and possibly other parts of the receiving node are adapted to enable the performance of one or more of the methods or procedures described above and illustrated e.g. in FIG. 2. The receiving node may comprise a communication unit 902 for communicating with other entities, and may comprise further functionality 907, which is illustrated with a dashed line.

The receiving node illustrated in FIG. 9 comprises processing means, in this example in form of a processor 903 and a memory 904, wherein said memory is containing instructions 905 executable by said processor, whereby the receiving node is operable to perform the method described above. That is, the receiving node is operative to, in a first reception mode, detect unsuccessful reception of a transmission from a transmitting node, said transmission being a message or a re-transmission related to the message. The receiving node is further operative to indicate the unsuccessful reception to the transmitting node; and to switch to a second reception mode, at least partly based on said detected unsuccessful reception. The receiving node is further operative to, in the second reception mode, receive at least one re-transmission related to the message. The first reception mode corresponds to an acknowledged first transmission mode comprising re-transmitting upon an indication of unsuccessful reception, and the second reception mode corresponds to a second transmission mode comprising re-transmitting without waiting for acknowledgement of message reception before transmitting the next re-transmission, as previously described.

As previously described, the time interval between subsequent transmissions related to the message may be shorter in the second transmission mode than in the first transmission mode. The time interval between re-transmissions in the second transmission mode may decrease over time. The second transmission mode may comprise continuous transmission. The first and second reception mode has the corresponding features and characteristics.

By execution of the instructions, the receiving node may further be operative to end the second reception mode at a successful reception related to the message, or, at the elapse of a time T from the switching to the second reception mode, or, at the elapse of a time T' from the detection of unsuccessful reception, e.g. at the start of the first unsuccessful reception of a first transmission related to the message, or, after the transmission of a predefined number of NACKs.

Further, the indication of unsuccessful reception may comprise one or more of a predefined number of NACKs related to the message; rich feedback including information about the receiver decoding status; and an indication of conditions at the receiving node preventing successful reception in the first transmission/reception mode.

Figure 10:
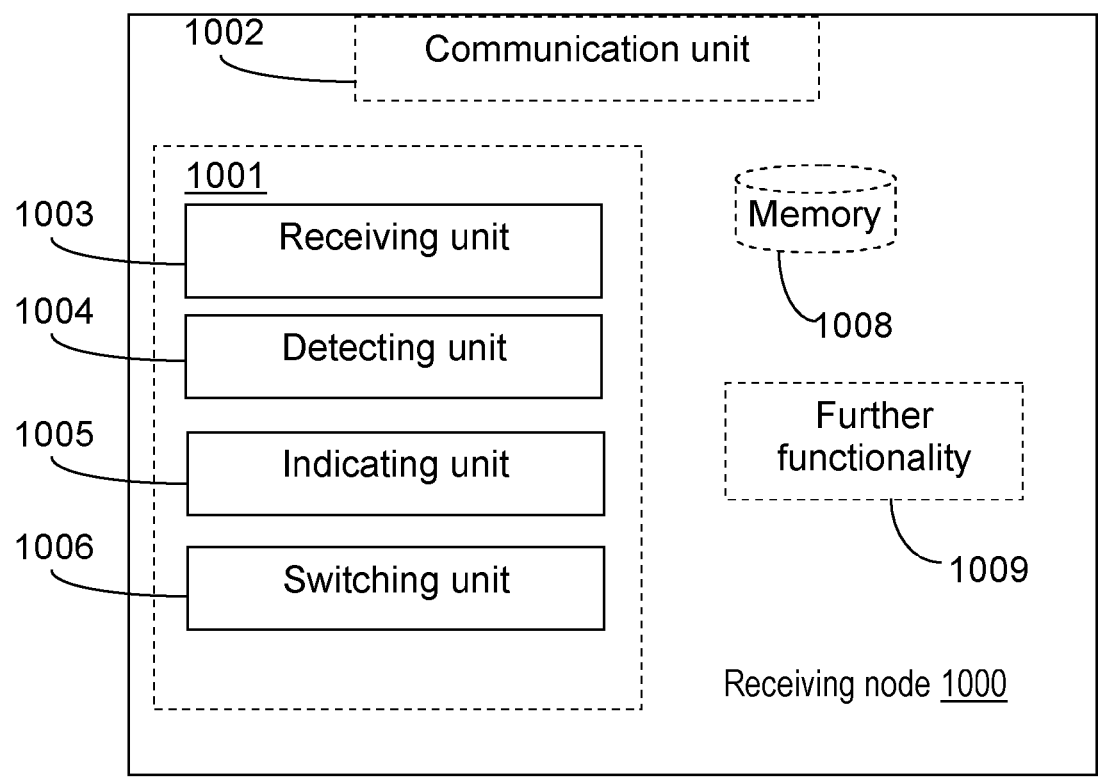

More resources, in terms of time, frequency, code, power, transmission/reception points and/or computational resources may be used for re-transmission in the second transmission mode than in the first transmission mode. The resources used for re-transmissions in the second transmission mode and reception mode may depend on information related to unsuccessful reception transmitted from the receiving node. The second reception mode, e.g. when to expect re-transmissions may depend on the information related to unsuccessful reception transmitted to the transmitting node The arrangement 901 may alternatively be implemented and/or schematically described as illustrated in FIG. 10. The arrangement 1001 comprises a detecting unit 1004, for, in an acknowledged first reception mode, detecting unsuccessful reception of a transmission from a transmitting node, said transmission being a message or a re-transmission related to the message. The arrangement further comprises an indicating unit 1005, for indicating the unsuccessful reception to the transmitting node. The arrangement further comprises a switching unit 1006, for switching to a second reception mode based on said detected unsuccessful reception.

The arrangement 1001 may be illustrated to comprise a receiving unit 1003, for the receiving of transmissions and re-transmissions from the transmitting node. This function may alternatively be regarded as implicit. The receiving node may be e.g. a user equipment UE, such as an LTE UE, a sensor, an actuator, a communication device, a tablet, a computer or any other device capable of wireless communication, or a radio base station, RBS, such as an LTE eNB, an access node or a relay. The receiving node may be operable to communicate in one or more wireless communication systems, such as UMTS, E-UTRAN or CDMA 2000.

The receiving node 1000, illustrated in FIG. 10, may further comprise a communication unit 1002 for communicating with other entities, one or more memories 1008 e.g. for storing of information and further functionality 1009, such as signal processing and/or scheduling.

As for the receiving node 900, the receiving node 1000, e.g. the arrangement 1001 may be adapted such that the time interval between subsequent transmissions related to the message may be shorter in the second transmission mode than in the first transmission mode. The time interval between re-transmissions in the second transmission mode may decrease over time. The second transmission mode may comprise continuous transmission. The first and second reception mode has the corresponding features and characteristics.

The receiving node may further be adapted to end the second reception mode at a successful reception related to the message, or, at the elapse of a time T from the switching to the second reception mode, or, at the elapse of a time T' from the detection of unsuccessful reception, e.g. at the start of the first unsuccessful reception of a first transmission related to the message, or, after the transmission of a predefined number of NACKs.

Further, the indication of unsuccessful reception may comprise one or more of a predefined number of NACKs related to the message; rich feedback including information about the receiver decoding status; and an indication of conditions at the receiving node preventing successful reception in the first transmission/reception mode.

More resources, in terms of time, frequency, code, power, transmission/reception points and/or computational resources may be used for re-transmission in the second transmission mode than in the first transmission mode. The resources used for re-transmissions in the second transmission mode and reception mode may depend on information related to unsuccessful reception transmitted from the receiving node. The second reception mode, e.g. when to expect re-transmissions may depend on the information related to unsuccessful reception transmitted to the transmitting node.

The arrangement 1001 and other parts of the receiving node could be implemented e.g. by one or more of: a processor or a micro processor and adequate software and storage therefore, a Programmable Logic Device, PLD, or other electronic component(s)/processing circuit(s) configured to perform the actions mentioned above.

It is to be understood that the choice of interacting units or modules, as well as the naming of the units are only for exemplifying purpose, and transmitting and receiving nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more". All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the presently described concept, for it to be encompassed hereby.

The invention claimed is:

1. A method performed by a transmitting node in a wireless communication network applying automatic repeat request, the method comprising:
   in a first transmission mode:
      periodically transmitting a message to a receiving node a first plurality of times according to a first time interval;
      detecting an indication of unsuccessful reception, at the receiving node, of the message or of a re-transmission related to the message within a time shorter than a latency budget of the message;
      switching to a second transmission mode based on the detected indication; and in the second transmission mode:
      re-transmitting said message, or part thereof. a second plurality of times according to a second time interval, without waiting for acknowledgement of message reception until the latency budget of the message has been exceeded, wherein the second time interval between re-transmissions in the second transmission mode decreases over time, and wherein the second time interval between re-transmissions in the second transmission mode is shorter than the first time interval between periodic transmissions in the first transmission mode.

2. The method according to claim 1, wherein the second transmission mode comprises continuous transmission.

3. The method according to claim 1, wherein the second transmission mode is ended when the latency budget of the message has been exceeded.

4. The method according to claim 1, wherein the indication of unsuccessful reception comprises:
   a predefined number of negative acknowledgements (NACKs) related to the message; or
   an absence of an acknowledgement (ACK) related to the message.

5. The method according to claim 1, wherein more resources, in terms of time, frequency, code, power, transmission points and/or computational resources are used for re-transmission in the second transmission mode than in the first transmission mode.

6. The method according to claim 1, wherein the resources used for re-transmissions in the second transmission mode depend on information related to unsuccessful reception received from the receiving node.

7. A method performed by a receiving node in a wireless communication network applying automatic repeat request, the method comprising:
   in a first reception mode:
      detecting unsuccessful reception of a transmission from a transmitting node within a time shorter than a latency budge of a message, said transmission being the message or a re-transmission related to the message;
      indicating the unsuccessful reception to the transmitting node;
      switching to a second reception mode based on said detected unsuccessful reception;
   in the second reception mode:
      receiving at least one re-transmission related to the message until the latency budget of the message has been exceeded;
   wherein the first reception mode corresponds to a first transmission mode comprising periodically re-transmitting the transmission a first plurality of times according to a first time interval,
   wherein the second reception mode corresponds to a second transmission mode comprising re-transmitting the transmission a second plurality of times according to a second time interval without waiting for acknowledgement of message reception until the latency budget of the message has been exceeded, and
   wherein the second transmission mode decreases over time, and
   wherein the second time interval between re-transmissions in the second transmission mode is shorter than the first time interval between periodic transmissions in the first transmission mode.

8. The method according to claim 7, wherein the second transmitting mode comprises more frequent re-transmissions than the first transmission mode.

9. The method according to claim 7, wherein a time duration between re-transmissions in the second transmission mode decreases over time.

10. The method according to claim 7, wherein the indicating of unsuccessful reception to the transmitting node comprises indicating of conditions preventing successful reception in the first transmission mode.

11. The method according to claim 7, wherein the second reception mode is ended when the latency budget of the message has been exceeded.

12. The method according to claim 7, wherein the indication of unsuccessful reception comprises:
- a predefined number of negative acknowledgements (NACKs) related to the message; or
- an absence of an acknowledgement (ACK) related to the message.

13. The method according to claim 12, wherein more resources in terms of time, frequency, code, power, transmission/reception points and/or computational resources are used for re-transmission in the second transmission mode than in the first transmission mode.

14. The method. according to claim 12, wherein the second reception mode depends on the information related to unsuccessful reception transmitted to the transmitting node.

15. The method according to claim 7, wherein second transmission mode comprises continuous transmission.

16. A transmitting node, operable in a wireless communication network applying automatic repeat request, the transmitting node, comprising a processor and a memory, said memory containing instructions executable by said processor, whereby the transmitting node is operative to:
- in a first transmission mode:
  - periodically transmit a message to a receiving node a first plurality of times according to a first time interval;
  - detect an indication of unsuccessful reception, at the receiving node, of the message or of a re-transmission related to the message within a time shorter than a latency budget of the message;
  - switch to a second transmission mode based on the detected indication: and
- in the second transmission mode:
  - re-transmit said message, or part thereof, a second plurality of times according to a second time interval, without waiting for acknowledgement of message reception until the latency budget of the message has been exceeded, and
- wherein the second time interval between re-transmissions in the second transmission mode decreases over time, and wherein the second time interval between re-transmissions in the second transmission mode is shorter than the first time interval between periodic transmissions in the first transmission mode.

17. The transmitting node according to claim 16, wherein the second transmission mode comprises continuous transmission.

18. The transmitting node according to claim 16, further operative to end the second transmission mode when the latency budget of the message has been exceeded.

19. The transmitting node according to claim 16, wherein the indication of unsuccessful reception comprises:
- a predefined number of negative acknowledgements (NACKs) related to the message; or
- an absence of an acknowledgement (ACK) related to the message.

20. The transmitting node according to claim 16, wherein more resources, in terms of time, frequency, code, power, transmission points and/or computational resources are used for re-transmission in the second transmission mode than in the first transmission mode.

21. The transmitting node. according to claim 16, wherein the resources used for re-transmissions in the second transmission mode depend on information related to unsuccessful reception received from the receiving node.

22. A receiving node, operable in a wireless communication network applying automatic repeat request, the receiving node comprising a processor and a memory, said memory containing instructions executable by said processor, whereby the receiving node is operative to:
- in a first reception mode:
  - detect unsuccessful reception of a transmission from a transmitting node within a time shorter than a latency budget of the message, said transmission being a message or a re-transmission related to the message;
  - indicate the unsuccessful reception to the transmitting node;
  - switch to a second reception mode based on said detected unsuccessful reception; and
- in the second reception mode:
  - receive at least one re-transmission related to the message until the latency budget of the message has been exceeded;
- wherein the first reception mode corresponds to a first transmission mode comprising periodically re-transmitting the transmission a first plurality of times according to a first time interval, and
- wherein the second reception mode corresponds to a second transmission mode comprising re-transmitting the transmission a second plurality of times according to a second time interval without waiting for acknowledgement of message reception until the latency budget of the message has been exceeded, and
- wherein the time duration between re-transmissions in the second transmission mode decreases over time, and
- wherein the second time interval between re-transmissions in the second transmission mode is shorter than the first time interval between periodic transmissions in the first transmission mode.

23. The receiving node according to claim 22, wherein the second transmitting mode comprises more frequent re-transmissions than the first transmission mode.

24. The receiving node according to claim 22, wherein the second transmission mode comprises continuous transmission.

25. The receiving node according to claim 22, further operative to end the second reception mode when the latency budget of the message has been exceeded.

26. The receiving node according to claim 22, wherein the indication of unsuccessful reception comprises:
- a predefined number of negative acknowledgements (NACKs) related to the message; or
- an absence of an acknowledgement (ACK) related to the message.

27. The receiving node according to claim 22, wherein more resources in terms of time, frequency, code, power, transmission/reception points and/or computational resources are used for re-transmission in the second transmission mode than in the first transmission mode.

28. The receiving node according to claim 22, wherein the second reception mode depends on the information related to unsuccessful reception transmitted from the receiving node.

* * * * *